(12) United States Patent
Van Steenberge et al.

(10) Patent No.: US 9,529,154 B2
(45) Date of Patent: Dec. 27, 2016

(54) METHOD FOR OPTICAL COUPLING BETWEEN A PHOTONIC INTEGRATED CIRCUIT AND AN EXTERNAL OPTICAL ELEMENT

(71) Applicants: IMEC VZW, Leuven (BE); Universiteit Gent, Ghent (BE)

(72) Inventors: Geert Van Steenberge, St. Amandsberg (BE); Dries Van Thourhout, Ghent (BE); Günther Roelkens, Melle (BE)

(73) Assignees: IMEC VZW, Leuven (BE); Universiteit Gent, Ghent (BE)

(*) Notice: Subject to any disclaimer, the term of this patent is extended or adjusted under 35 U.S.C. 154(b) by 0 days.

(21) Appl. No.: 14/664,673

(22) Filed: Mar. 20, 2015

(65) Prior Publication Data
US 2015/0268419 A1 Sep. 24, 2015

Related U.S. Application Data

(60) Provisional application No. 61/968,887, filed on Mar. 21, 2014.

(51) Int. Cl.
*G02B 6/30* (2006.01)
*C03C 23/00* (2006.01)
(Continued)

(52) U.S. Cl.
CPC .............. *G02B 6/30* (2013.01); *C03C 13/04* (2013.01); *C03C 15/00* (2013.01);
(Continued)

(58) Field of Classification Search
None
See application file for complete search history.

(56) References Cited

U.S. PATENT DOCUMENTS

| | | | |
|---|---|---|---|
| 5,402,511 A * | 3/1995 | Malone | G02B 6/1228 385/43 |
| 7,095,931 B2 * | 8/2006 | Sezerman | C03C 23/0025 385/123 |

(Continued)

*Primary Examiner* — Mike Stahl
(74) *Attorney, Agent, or Firm* — Knobbe, Martens, Olson & Bear LLP (57) ABSTRACT

The present disclosure generally relates to a method of optically coupling a photonic integrated circuit and an external optical component. In one aspect, a method comprises: providing a photonic integrated circuit comprising at least one integrated optical waveguide, the photonic integrated circuit having a cover layer; providing at least one optical component external to the photonic integrated circuit, the at least one optical component having an optical coupling facet and configured to be optically coupled to the at least one integrated optical waveguide, thereby forming an assembly; determining a position of the optical coupling facet of the at least one optical component in the assembly; determining a position of the at least one integrated optical waveguide; designing an optical interface pattern between the optical coupling facet of the at least one optical component in the assembly and the at least one integrated optical waveguide; and writing the interface pattern in the cover layer of the photonic integrated circuit by means of a femtosecond laser, thereby forming an optical interface for optically coupling the optical coupling facet and the at least one integrated optical waveguide.

15 Claims, 4 Drawing Sheets

(51) Int. Cl.
*C03C 15/00* (2006.01)
*G02B 6/42* (2006.01)
*G02B 6/122* (2006.01)
*C03C 13/04* (2006.01)
*G02B 6/13* (2006.01)

(52) U.S. Cl.
CPC ........ *C03C 23/0025* (2013.01); *G02B 6/1228* (2013.01); *G02B 6/42* (2013.01); *G02B 6/13* (2013.01); *G02B 6/305* (2013.01)

(56) References Cited

U.S. PATENT DOCUMENTS

| | | | | |
|---|---|---|---|---|
| 7,587,110 | B2* | 9/2009 | Singh | G02B 6/02042 385/126 |
| 8,270,784 | B2* | 9/2012 | Thomson | G02B 6/30 385/135 |
| 2004/0165637 | A1* | 8/2004 | Bullington | G02B 6/34 372/50.11 |
| 2004/0190832 | A1* | 9/2004 | Brockhaus | G02B 6/12002 385/49 |
| 2004/0258359 | A1* | 12/2004 | Corkum | B82Y 20/00 385/39 |
| 2005/0244123 | A1* | 11/2005 | Hirao | B23K 26/0066 385/129 |
| 2010/0142896 | A1* | 6/2010 | Riester | G02B 6/138 385/88 |
| 2012/0170111 | A1* | 7/2012 | Doerr | G02B 6/4204 359/334 |
| 2013/0051729 | A1* | 2/2013 | Chen | G02B 6/30 385/32 |
| 2014/0177995 | A1* | 6/2014 | Mohammed | G02B 6/36 385/14 |

\* cited by examiner

METHOD FOR OPTICAL COUPLING BETWEEN A PHOTONIC INTEGRATED CIRCUIT AND AN EXTERNAL OPTICAL ELEMENT

CROSS-REFERENCE TO RELATED APPLICATIONS

This application claims the benefit of U.S. Provisional Application No. 61/968,887, filed Mar. 21, 2014, the entirety of which is hereby incorporated by reference.

BACKGROUND

Field

The disclosed technology generally relates to methods of optically coupling a photonic integrated circuit and an external optical component, and more particularly relates to methods of forming an optical interface between an integrated waveguide on a photonic integrated circuit and an external optical component. The disclosed technology further relates to systems and devices comprising such optical interfaces.

Description of the Related Technology

Generally, photonic integrated circuits (PICs) refer to circuits comprising electrical and optical components integrated on a single platform (e.g., a package or a die), which can enable on-chip and/or chip-to-chip data transfer at much higher bandwidths compared to traditional all-electrical integrated circuits. In addition, PICs can advantageously be fabricated at relatively low cost by using wafer-scale process technologies similar to technologies used to process all-electrical integrated circuits. Furthermore, the PICs can offer an added advantage of a very high level of functional integration, enabled in part by relatively small cross sections of the integrated silicon optical waveguides, which typically have less than about 1 micrometer mode-field diameter (MFD).

However, packaging of such PICs continues to pose several technological challenges, and some packaging processes can be expensive. The high packaging cost can be related to the high alignment accuracy that is often employed to couple light efficiently from compact optical waveguides on the integrated circuit to, e.g., single mode optical fibers having much larger dimensions (e.g. about 10 micrometer MFD) than the integrated optical waveguides.

Various approaches for coupling light between integrated optical waveguides and single mode optical fibers have been suggested. In one of the approaches, out-of-plane coupling has been demonstrated using diffraction gratings etched in the top surface of SOI waveguides. While these grating couplers can enable optical access anywhere on the chip surface, they can suffer from inherent bandwidth limitations. The best devices have insertion losses of 1 dB to 2 dB, and 1 dB bandwidths can for example be between 40 nm and 50 nm. In another one of the approaches, inverse tapers are used in combination with polymer, $SiO_2$, or SiON waveguides. In some of the approaches, coupling losses of less than 1 dB can be maintained over wavelength ranges of more than 100 nm. However, both approaches disadvantageously rely on highly precise positioning of external fibers with respect to on-chip coupling structures, which involves an active alignment procedure whereby the coupling efficiency is dynamically monitored and optimized.

SUMMARY OF CERTAIN INVENTIVE ASPECTS

Certain inventive aspects relate to methods for optical coupling between optical waveguides integrated on a photonic integrated circuit and external optical components such as optical fibers, wherein a good optical coupling, e.g. with coupling losses of less than 1 dB over a wavelength range of 100 nm or more, can be obtained without the need for an active alignment procedure.

In one aspect, the disclosed technology generally relates to a method of forming an optical interface between at least one integrated optical waveguide on a photonic integrated circuit and at least one external optical component. The method comprises providing a photonic integrated circuit comprising at least one integrated optical waveguide, wherein the photonic integrated circuit includes a cover layer. The method additionally comprises providing at least one optical component external to the photonic integrated circuit, the at least one optical component having an optical coupling facet, the at least one optical component being provided to be optically coupled to the at least one integrated optical waveguide, to thereby form an assembly. The method further comprises determining an actual or an anticipated position of the optical coupling facet of the at least one external optical component in the assembly and determining a position of the at least one integrated optical waveguide. The method additionally includes designing an optical interface pattern for optically connecting (optically coupling) the optical coupling facet of the at least one external optical component with the corresponding at least one integrated optical waveguide. The method further includes writing the interface pattern in the cover layer of the photonic integrated circuit by means of a femtosecond laser, thereby forming the optical interface. The method may further comprise optically coupling the at least one optical component to the at least one integrated optical waveguide, thereby forming the assembly. The optical coupling may include physically connecting, e.g. attaching, the at least one optical component to the photonic integrated circuit or to the cover layer.

In embodiments of the present disclosure, the optical interface comprises intermediate optical waveguide structures formed in the cover layer. The interface pattern may further comprise mode converter components, for example for matching a mode size between an intermediate optical waveguide structure and an integrated optical waveguide and/or for example for matching a mode size between an intermediate optical waveguide structure and an external optical component.

The external optical component (optical component external to the photonic integrated circuit) may, for example, include an optical fiber, a board-level waveguide, another photonic integrated circuit, an external laser diode, an external photodetector or an external amplifier, among other optical components, the present disclosure not being limited thereto.

In embodiments of the present disclosure, the cover layer may for example include a silicon oxide layer, a SiON layer or a polymer layer, the present disclosure not being limited thereto. The cover layer may have the function of an upper cladding layer of the at least one integrated optical waveguide.

In other embodiments of the present disclosure, the cover layer may include a transparent carrier, such as for example a glass carrier. In such embodiments the photonic integrated circuit can be attached to the carrier at a first side, and writing the interface pattern in the carrier (cover layer) can be performed from a second side opposite to the first side.

In such embodiments wherein the cover layer includes a glass carrier, the method may further comprise defining, by means of a femtosecond laser, alignment features for the external optical component in the glass carrier. The alignment features for the external optical component may for example comprise alignment grooves for an external optical fiber, e.g. for physically connecting an external optical fiber. It is an advantage of such embodiments that writing the interface pattern in the cover layer and defining alignment features can be done with the same femtosecond laser in a single laser step, resulting in a good alignment between the interface pattern and the alignment features, and thus a good alignment between the interface pattern and the external optical component.

Determining the position of an optical coupling facet of the at least one external optical component and determining the position of the at least one integrated optical waveguide may for example be done by means of an automated process using high-precision machine vision.

Writing the interface pattern in the cover layer of the photonic integrated circuit by means of a femtosecond laser may comprise forming the interface pattern by providing tightly focused femtosecond infrared laser pulses that can locally create a permanent refractive index modification in the cover layer.

In another aspect, the disclosed technology generally relates to an assembly comprising a photonic integrated circuit comprising at least one integrated optical waveguide and having a cover layer; and at least one optical component external to the photonic integrated circuit, the optical component having an optical coupling facet being optically coupled to the at least one integrated optical waveguide through an optical interface, wherein the optical interface comprises an interface pattern formed in the cover layer. The at least one optical component may be physically connected to, e.g. attached to, the photonic integrated circuit or to the cover layer.

In embodiments of the present disclosure, the optical interface comprises at least one intermediate optical waveguide structure formed in the cover layer. The interface pattern may further comprise at least one mode converter component, for example for matching a mode size between an intermediate optical waveguide structure and an integrated optical waveguide and/or for example for matching a mode size between an intermediate optical waveguide structure and an external optical component.

The external optical component (optical component external to the photonic integrated circuit) may, for example, include an optical fiber, a board-level waveguide, another photonic integrated circuit, an external laser diode, an external photodetector or an external amplifier, among other optical components, the present disclosure not being limited thereto.

In embodiments of the present disclosure, the cover layer may for example include a silicon oxide layer, a SiON layer or a polymer layer, the present disclosure not being limited thereto. The cover layer may have the function of an upper cladding layer of the at least one integrated optical waveguide.

In other embodiments of the present disclosure, the cover layer may include a transparent carrier, such as for example a glass carrier. In such embodiments wherein the cover layer includes a glass carrier, the cover layer may further comprise at least one alignment feature for the at least one optical component. The at least one alignment feature may for example comprise an alignment groove for an external optical fiber.

It is an advantage of some embodiments described herein that the optical coupling between external optical components, such as, e.g., optical fibers, and integrated waveguides can be performed using a passive alignment procedure. In some embodiments, the optical coupling can be performed without using an active alignment procedure involving dynamic monitoring of coupling efficiencies.

It is an additional advantage of some embodiments described herein that the optical coupling between external optical components, such as e.g. optical fibers, and photonic integrated circuits can be performed at a lower cost and with a higher throughput compared to known methods.

It is an additional advantage of some embodiments described herein that each optical connection (each optical channel) of the optical interface may be formed independently, such that accumulation of alignment errors may be avoided. This is different from prior art methods, wherein e.g. in case of alignment of an array of integrated waveguides with an array of external optical components, such as an array of optical fibers, a small angular misalignment may result in a large transverse misalignment.

It is an additional advantage of some embodiments described herein that optical coupling can be performed substantially in the plane of the photonic integrated circuit (in-plane coupling or horizontal coupling). Packaging issues related to out-of-plane coupling or vertical coupling, e.g., using gratings, can be avoided. In embodiments of the present disclosure, the package can be less bulky and less fragile than in the case of vertical coupling, and obstruction of an area of the chip surface by external optical components such as optical fibers can be avoided.

It is an additional advantage of some embodiments described herein that a pitch of an on-chip integrated waveguide array can be adjusted to a pitch of an external optical fiber array, which is typically about 250 micrometers, relatively easily and for less cost.

It is an additional advantage of some embodiments described herein that it allows a large design freedom.

Certain objects and advantages of various inventive aspects have been described herein above. Of course, it is to be understood that not necessarily all such objects or advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein. Further, it is understood that this summary is merely an example and is not intended to limit the scope of the disclosure. The disclosure, both as to organization and method of operation, together with features and advantages thereof, may best be understood by reference to the following detailed description when read in conjunction with the accompanying drawings.

Any reference signs in the claims shall not be construed as limiting the scope of the present disclosure.

In the different drawings, the same reference signs refer to the same or analogous elements.

DETAILED DESCRIPTION OF CERTAIN ILLUSTRATIVE EMBODIMENTS

In the following detailed description, numerous specific details are set forth in order to provide a thorough understanding of the disclosure and how it may be practiced in particular embodiments. However, it will be understood that the present disclosure may be practiced without these specific details. In other instances, well-known methods, procedures and techniques have not been described in detail, so as not to obscure the present disclosure. While the present disclosure will be described with respect to particular embodiments and with reference to certain drawings, the disclosure is not limited hereto. The drawings included and described herein are schematic and are not limiting the scope of the disclosure. It is also noted that in the drawings, the size of some elements may be exaggerated and, therefore, not drawn to scale for illustrative purposes.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

As used herein, a photonics integrated circuit (PIC) refers to a photonic circuit comprising at least one integrated optical component. Non-limiting examples of integrated optical components include an integrated optical cavity, an integrated optical coupler, a waveguide, a taper, a filter, a phase-shifter, a grating, a modulator, a detector, a source, a multiplexer (MUX), a demultiplexer (DEMUX) or a combination thereof, among others. The integrated optical components can be active or passive. The optical components can be integrated monolithically or heterogeneously. As used herein, monolithic integration refers to integration technologies that use a single process flow to fabricate the diverse components, potentially using different materials such as, for example, integrated germanium detectors in a silicon photonics integrated circuit. In contrast, as used herein, heterogeneous integration refers to integration technologies that integrate components or materials that are fabricated separately or independently onto integrated platforms. Examples of heterogeneous integration include flip-chip bonding of detectors, bumping, gluing, wire bonding, co-packaging, and integration using through-silicon via technologies, to name a few.

As used herein, light or radiation refers to electromagnetic radiation having a wavelength in a suitable range such that the electromagnetic radiation is not absorbed substantially by the materials used (e.g. the waveguide materials). For example, electromagnetic radiation can have a wavelength between about 1 µm and about 2 µm, which can also be referred to as near infrared radiation (NIR) or short wavelength infrared radiation (SWIR), although embodiments disclosed herein are not limited thereto. It will be appreciated that some electromagnetic radiations having a wavelength that is near or greater than an optical band edge of a semiconductor material can travel substantial distances without being substantially absorbed. Thus, a NIR electromagnetic radiation having a wavelength near or greater than a room temperature band edge wavelength of silicon, e.g., 1.1 eV, can be used as a waveguide material.

In some embodiments described herein, the devices and methods can be associated with an SOI (Silicon-On-Insulator) material system, also referred to as silicon photonics system, wherein the integrated optical waveguides have a core layer, e.g., a silicon core layer having a first index of refraction, and an insulator cladding layer, e.g., a silicon oxide lower cladding layer, having a second index of refraction different from the first index of refraction. However, the devices and methods of the present disclosure can be based on other material systems, such as for example III-V material systems, metallic layers, low index contrast material systems (e.g. polymer waveguides, glass/silica waveguides, $Al_xGa_{1-x}As$ waveguides, $In_xGa_{1-x}AsyP_{1-y}$ waveguides, SiN waveguides, InP based waveguides), TriPleX technology based waveguides or a combination thereof, as well as other material systems. In some embodiments, the second index of refraction of the cladding layer is lower than the first index of refraction of the core layer. In these embodiments, an electromagnetic radiation can travel at through at least part of the core layer under an attenuated total internal reflection (ATR) mode.

The disclosed technology generally relates to methods of providing improved optical coupling between photonic integrated circuits and external optical components such as e.g. optical fibers, and more particularly to providing improved optical coupling between at least one integrated waveguide of the photonic integrated circuit and at least one external optical component, e.g., an optical fiber. More particularly, the disclosed technology relates to methods of forming an optical interface between at least one integrated waveguide of a photonic integrated circuit and at least one external optical component, e.g., an optical fiber.

In some embodiments of the present disclosure, integrated waveguides are optically coupled to external optical fibers. However, the present disclosure is not limited thereto and the method can be used for optical coupling between integrated waveguides and other external optical components such as for example board-level waveguides, another photonic integrated circuit, external laser diodes, external photodetectors or external amplifiers.

Figure 1:
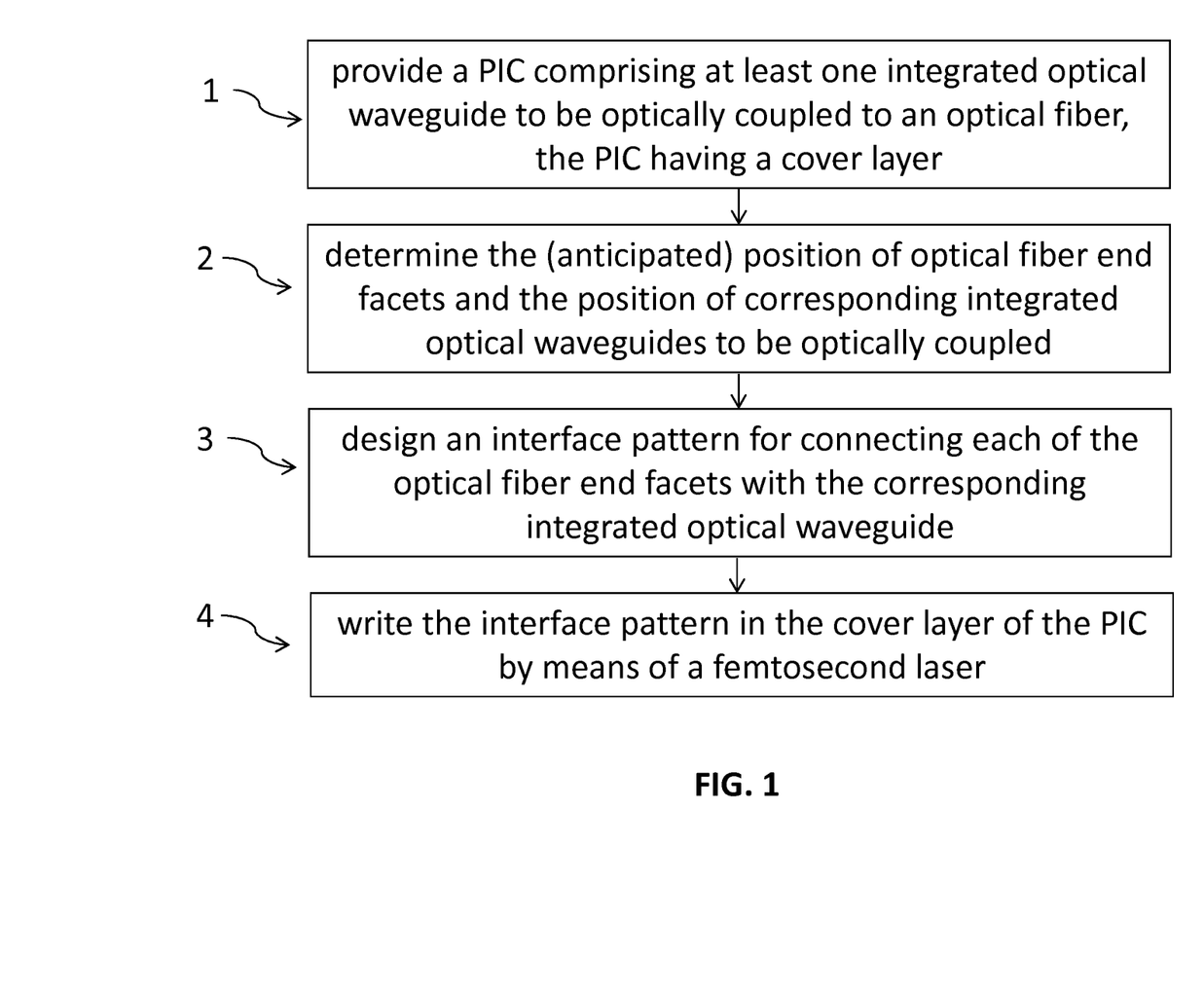
FIG. 1 is a flow chart illustrating a method of optically coupling a photonic integrated circuit and an external component, according to some embodiments.

FIG. 1 illustrates a method of optically coupling a photonic integrated circuit and an external optical component according to some embodiments.

The optical coupling method of FIG. 1 includes providing at a process 1 a photonic integrated circuit (PIC), wherein the photonic integrated circuit comprises at least one integrated optical component and at least one integrated optical waveguide to be optically coupled to an external optical component, e.g., an external optical fiber. In embodiments wherein the PIC is silicon-based, e.g. an SOI-based PIC, the integrated optical waveguide has a silicon core layer. The photonic integrated circuit of process 1 additionally has a cover layer, such as for example a silicon oxide layer, a SiON layer or a polymer layer, while the present disclosure is not limited thereto. In some embodiments, the cover layer covers the entire substrate and can serve as an upper cladding layer of the at least one integrated silicon waveguide. The cover layer may, for example, have a thickness selected to be in the range between about 1 micrometer and about 20 micrometer, the present disclosure not being limited thereto. Alternatively, the cover layer can include a transparent carrier, such as for example a glass carrier, to which the photonic integrated circuit is attached. In embodiments of the present disclosure, the photonic integrated circuit may comprise a plurality of integrated optical waveguides to be optically coupled to a plurality of external optical fibers.

The optical coupling method of FIG. 1 additionally includes determining, at a process 2, a position of an optical fiber end facet (also referred to as an optical coupling facet) of the external optical component, e.g., the external optical fiber, as well as a position of a corresponding integrated optical waveguide to be optically coupled to the external optical fiber having the optical fiber end facet. Determining the fiber facet position and determining the position of the corresponding integrated optical waveguide to be optically coupled to the external optical fiber having the optical fiber end facet may, for example, be performed by means of an automated process using high-precision machine vision. In some embodiments, determining the position of the optical fiber end facet comprises determining an anticipated position of the optical fiber end facet, where the optical fiber may not yet be present at the process 2 but its anticipated position may be determined based on the location of other optical features, such as for example alignment crosses or other alignment features present on the PIC, or based on the location of V-grooves (e.g. provided in a glass cover) where the optical fibers are to be positioned.

The optical coupling method of FIG. 1 additionally includes, based on positions determined at the process 2, designing an optical interface pattern at a process 3, wherein the optical interface pattern comprises intermediate optical paths for optically connecting the optical fiber end facet with the corresponding integrated optical waveguide. This optical interface pattern comprises appropriate waveguide paths and/or intermediate optical waveguide structures between the at least one integrated optical waveguide and corresponding optical fiber facets. The optical interface pattern may further comprise mode converter components, to adiabatically adjust the mode size as much as possible. Mode expansion tapers and/or mode converter components can also be provided on the silicon photonics integrated circuit to improve the mode matching between the intermediate waveguides of the optical interface pattern and the silicon waveguides on the photonic integrated circuit.

The optical coupling method of FIG. 1 additionally includes forming, e.g., writing, at a process 4 the optical interface pattern in the cover layer of the PIC by means of femtosecond laser inscription. In some embodiments of the present disclosure, femtosecond laser inscription can be used for in-situ writing of the optical interface pattern, thereby forming intermediate waveguides and mode converter components in the cover layer (e.g. cladding layer, e.g. transparent carrier) that is present at an upper surface of the PIC. These intermediate waveguides and mode converter components can provide the chip-to-fiber optical interface, i.e. they can provide an optical connection or optical coupling between the at least one integrated silicon waveguide and the corresponding optical fibers. The optical interface pattern is formed in the cover layer on top of the photonic integrated circuit by focusing femtosecond infrared laser pulses within an area of the cover layer that is sufficiently small such that the radiation intensity received by the sufficiently small area is sufficient to induce a modification, e.g., a permanent modification, of the cover layer material. For example, the focused laser pulses can induce a permanent refractive index modification in the cover layer. Such modification may be caused, e.g., by photoionization of the atoms of the cover layer material. In some embodiments of the present disclosure, the pulses of the femtosecond laser can be tuned to have a pulse duration less than about 400 fs, e.g., between 1 fs and 400 fs, between 1 fs and 100 fs, or between about 10 and 100 fs, as measured by a full-width at half maximum of the amplitude of a pulse. In some embodiments, the energy imparted to the sufficiently small area of the cover layer may be larger than about 10 micro-Joule (µJ), e.g., between about 10 µJ and 10 mJ, between about 10 µJ and 1 mJ or between about 10 µJ and about 100 µJ. In some embodiments, the energy imparted to the sufficiently small area of the cover layer may be smaller than about 10 µJ, e.g., between about 0.1 µJ and 10 µJ or between about 1 µJ and 10 µJ. In various embodiments, the energy density imparted to the cover layer that is sufficient to induce a refractive index modification may between about $10^{12}$ W/cm$^2$ and about $10^{14}$ W/cm$^2$, between about $10^{12}$ W/cm$^2$ and $10^{13}$ W/cm$^2$ or between about $10^{13}$ W/cm$^2$ and about $10^{14}$ Wcm$^2$. The repetition rate up to about 5 MHz may be used, such as e.g., between about 100 kHz and about 5 MHz, or between about 1 MHz and about 5 MHz. In some embodiments, the relative refractive index change is greater than about 3%, e.g., between about 3% and about 25% or between about 3% and about 10%. In some embodiments, the relative refractive index change is less than about 3%, e.g., between about 1% and about 3%.

The energy density used to modify the cover layer material may depend upon the type of laser system. In some embodiments, femtosecond laser writing is performed using a regeneratively amplified Ti:sapphire laser system that is configured to provide relatively high pulse energies (e.g., in the range of micro-Joules to milli-Joules) at relatively low repetition rates (e.g., between about one kHz to about few tens of kHz). In some other embodiments, femtosecond laser writing is performed using an oscillator-only Ti:sapphire system configured to provide relatively low pulse energies (e.g., in the range of nano-Joules) and relatively high repetition rates (e.g., between about one MHz to about few tens of MHz). In still some other embodiments, a high pulse energy (nano-Joules to micro-Joules) Yb-doped fiber laser may for example be used at repetition rates in the range between about 100 kHz and about 1 MHz). While these and other femtosecond laser systems can be effective at modifying transparent dielectrics, significant differences exist between the mechanism underlying the modification, and therefore, also the strength of the modification, the level of damage (if any), and whether the refractive index change is positive or negative. Parameters that affect the writing properties include the sample translation speed, focused beam shape, beam polarization, pulse energy, pulse repetition rate, wavelength and pulse duration, to name a few. The type of material modification is also affected by, for example, bandgap energy, the material being crystalline or amorphous, thermal characteristics, and fracture strength.

Although investigations into understanding the nature of this permanent refractive index modification and the conditions that produce it are ongoing, without being bound to any theory, the modification process may be initiated by the rapid absorption of laser energy through nonlinear excitation mechanisms. The subsequent dissipation of this energy into the lattice can cause the index modification. It will be appreciated that different levels of refractive index modification can be induced by causing different types of material modification within a focal volume (i.e., a volume of material subject to sufficient intensity, e.g., 1/e of a peak intensity, of a focused laser beam) of the cover layer. In various embodiments where the cover layer is formed of a bulk glass material, e.g., a glass formed of silica (silicon oxide), the optical interface pattern can be formed by choosing parameters of the pulsed laser described above to induce one of three different types of material modification using a femtosecond laser direct-write technique described above: (i) inducing a smooth isotropic refractive index change within the focal volume, (ii) inducing a birefringent refractive index change (e.g., an anisotropic refractive index change or a refractive index change whose value depends on the polarization and/or the direction of propagation of the incident light) within the focal volume, and (iii) inducing one or more voids or cavities within the focal volume. Without being bound to any theory, a smooth refractive index change (e.g., modification type (i) above) induced by femtosecond laser radiation can be due to a contribution of color center formation, densification (structural change), and/or a thermal effect (e.g., local melting or annealing). Under slightly different parameters (e.g., modification type (ii) above), modified regions (e.g., in fused silica) can contain nanoporous structures that are dependent on the polarization of the femtosecond laser writing beam. Under some circumstances, these nanostructures can be self-ordered and/or periodic (with a size and period as low as between about 20 nm and about 140 nm, respectively) while being oriented, e.g., in a direction perpendicular to the electric field vector of a linearly polarized femtosecond laser writing beam. At extremely high intensities (iii), the region of modification is characterized by material damage or void formation. Without being bound to any theory, due to avalanche ionization and continuous impact ionization, a localized plasma can be formed in the focal region. As the temperature increases in the exposed region, the plasma causes a large charge separation resulting in high pressures. This charge separation is sufficient to cause a Coulomb explosion (micro-explosion) generating a shock wave. Because this explosion or expansion occurs within the bulk of a material, the shock wave carries matter and energy away from the focal volume, compressing the surrounding material and leaving a rarified (less dense or hollow core) central region, which can include one or more voids or cavities.

A method according to some embodiments enables the direct-write fabrication of intermediate optical structures in the cover layer, simply by moving the sample through the focus of a femtosecond laser beam (or vice versa). Writing speeds may be in the order of up to about 100 mm/s. The material surrounding the focal volume remains largely unaffected by the writing beam passing through it, allowing structures to be written at arbitrary depths and in a 3D fashion.

In embodiments of the present disclosure wherein the cover layer is a glass cover or glass carrier formed of, e.g., silica (silicon oxide), alignment features such as for example optical fiber alignment grooves (e.g. V-shaped grooves or U-shaped grooves) may be defined in the glass cover together, e.g., in a single process, with the writing of the interface pattern in the cover layer. It can be an advantage that both the alignment features and the interface pattern are defined in the same laser process, which can not only reduce processing cost but also enhance the level of alignment between the alignment features and the interface pattern. In some embodiments, irradiation conditions used to define the alignment features and the interface pattern may be substantially different from each other. In various embodiments, irradiation conditions used to define the alignment features and the interface pattern my each be independently adapted to (i) induce a smooth isotropic refractive index change within the focal volume, (ii) induce a birefringent refractive index change within the focal volume, or (iii) induce one or more void cavities within the focal volume, as described above. For example, in one embodiment, the interface pattern may be defined in the glass cover by irradiating the sample with a focused femtosecond laser, preferably with laser parameters (e.g. a low fluence) adapted to obtain a smooth refractive index change (corresponding to modification type (i) described above), while the alignment features may be defined in the glass cover by direct ablation of glass or by a process technique referred to as Femtosecond Laser Irradiation followed by Chemical Etching (FLICE). The FLICE technique comprises irradiating the sample with focused femtosecond laser pulses, thereby modifying the glass at predetermined locations irradiated with the laser pulses, followed by a selective or preferential dry or wet etch-removal of the modified glass material from the irradiated locations of the sample. The selective or preferential dry or wet etch-removal can be performed using, for example a suitable solution or vapor comprising an etchant such as hydrofluoric acid (HF) and/or KOH, while the present disclosure is not limited thereto. Irradiating the sample for defining the alignment features using the FLICE technique is can be performed, e.g., at a moderate laser fluence, e.g., higher than the laser fluence used for writing the interface pattern. Irradiating the sample for defining the alignment features using the FLICE technique can be performed using, e.g., laser parameters corresponding to modification type (ii) described above. When using such moderate laser fluence, sub-wavelength nanocracks can be created in the glass cover, yielding a good etch selectivity between the irradiated locations and the non-irradiated locations. As an alternative to the FLICE technique, the alignment features can be formed by direct laser ablation, using laser parameters corresponding to modification type (iii) described above.

It is an advantage of a method in accordance with some embodiments disclosed herein that there is no need for performing an active alignment procedure. As used herein, active alignment refers to an approach wherein the preferred position of optical fibers relative to e.g. coupling structures on a photonic integrated circuit is determined based on dynamic monitoring and optimization of the coupling efficiency. Instead, in embodiments of the present disclosure, a passive alignment method is used wherein an optical interface is formed that is adaptive to the position of the optical fibers and the corresponding integrated waveguides.

In some embodiments, the optical fibers are physically connected to the photonic integrated circuit or to the transparent carrier if present. Fiber alignment can be provided by passive alignment structures, e.g. V-grooves, integrated in the silicon sub-assembly or in the transparent carrier.

Figure 2:
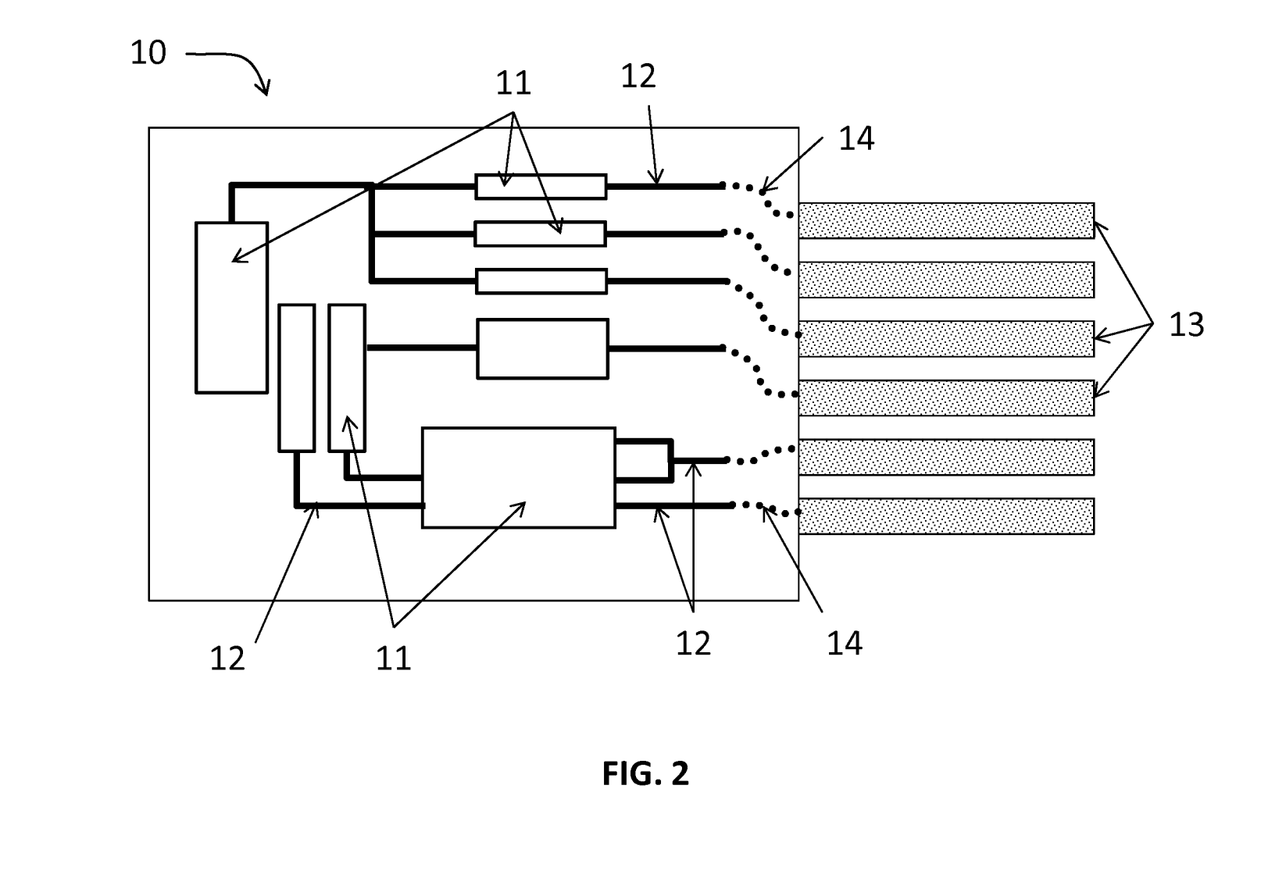
FIG. 2 schematically illustrates a photonic integrated circuit having integrated optical waveguides coupled to external optical components, according to some embodiments.

FIG. 2 schematically shows an example of a photonic integrated circuit (PIC) 10 with optical fibers 13 coupled to the PIC 10, in accordance with some embodiments. In the illustrated embodiment, the PIC 10 comprises a plurality of optical components 11 and a plurality of integrated optical waveguides 12, e.g. silicon waveguides. At least one of the integrated optical waveguides 12 provides an on-chip optical connection between the integrated optical components 11. At least another one of the integrated optical waveguides 12 is optically coupled to an optical fiber 13 by using an optical interface comprising, e.g., intermediate waveguide structures 14 that can be written, e.g., by means of a femtosecond laser in a cover layer, e.g. cladding layer, of the PIC 10, according to various methods described above for forming optical interface patterns. As described above, the optical interface may in addition comprise mode converter components (not shown in FIG. 2) that may also be written in the cover layer, e.g. cladding layer, of the PIC by means of a femtosecond laser. Mode converter components may also be provided on the silicon photonics integrated circuit to improve mode matching to the intermediate waveguide structures 14 of the optical interface. At the interface between the intermediate waveguide structures 14 and the optical fibers 13, a tapered section may be provided (the intermediate waveguide structure may be tapered) to match the fiber mode. Alternatively, a lensed fiber may be used.

Figure 3A:
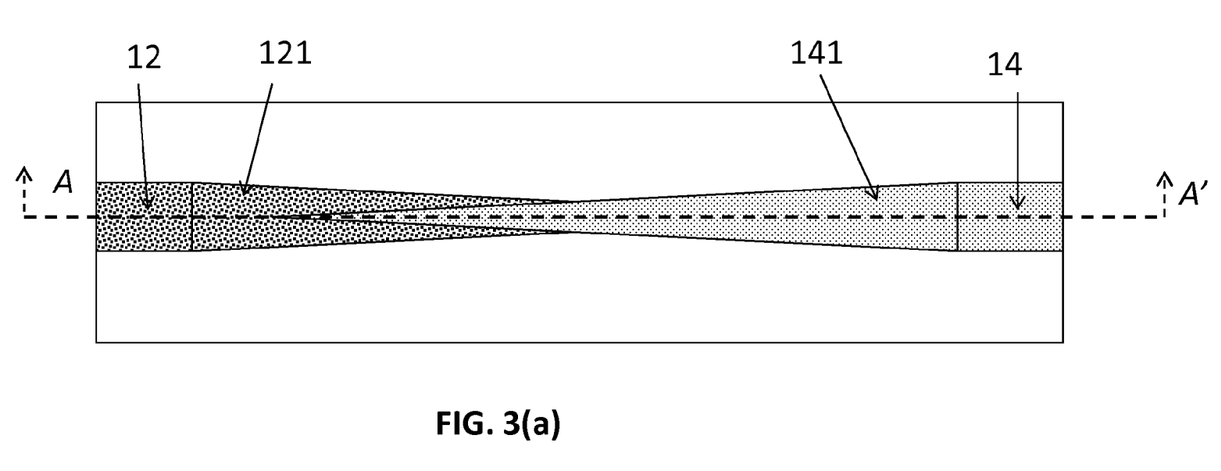
FIG. 3(a) schematically illustrates a top view of a structure for optically coupling an integrated optical waveguide and an external optical component, according to some embodiments.
Figure 3B:
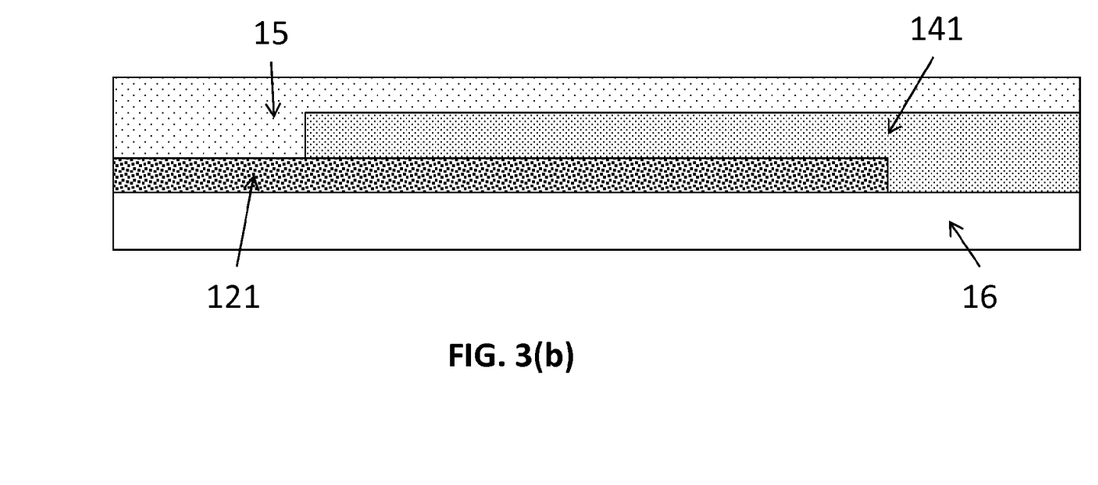
FIG. 3(b) schematically illustrates a cross sectional view taken along the section A-A' of the structure in FIG. 3(a) for optically coupling an integrated optical waveguide and an external optical component, according to some embodiments.

An example of a mode converter component that may be used in some embodiments of the present disclosure for optical coupling between an integrated silicon waveguide and an intermediate waveguide written in the cover layer, e.g. cladding layer, is schematically shown in FIG. 3(a) (top view) and FIG. 3(b) (cross section along line A-A'). In the illustrated embodiment of a mode converter, an integrated optical waveguide, e.g., a silicon waveguide 12, comprises a tapered silicon section 121 and an intermediate waveguide structure 14 comprises a tapered oxide section 141. At least a portion of the tapered silicon section 121 overlays a portion of the tapered oxide section 141, thereby enabling evanescent coupling of the electromagnetic radiation therebetween. In some embodiments of the present disclosure, the intermediate waveguide structure 14 having the tapered oxide section 141 is formed in the cover layer, e.g. cladding layer, of the PIC similar to PIC 10 (FIG. 2) by using a femtosecond laser inscription technique similar to the techniques described above. FIG. 3(b) also shows a substrate 16 of the PIC and a cover layer 15 on the PIC. In FIG. 3(b), the tapered oxide section 141 is shown with an upper surface substantially parallel to the substrate surface. However, the present disclosure is not limited thereto, and the tapered oxide section 141 may for example also be tapered in a vertical direction (i.e. a direction substantially perpendicular to the plane of the substrate 16).

Figure 4:
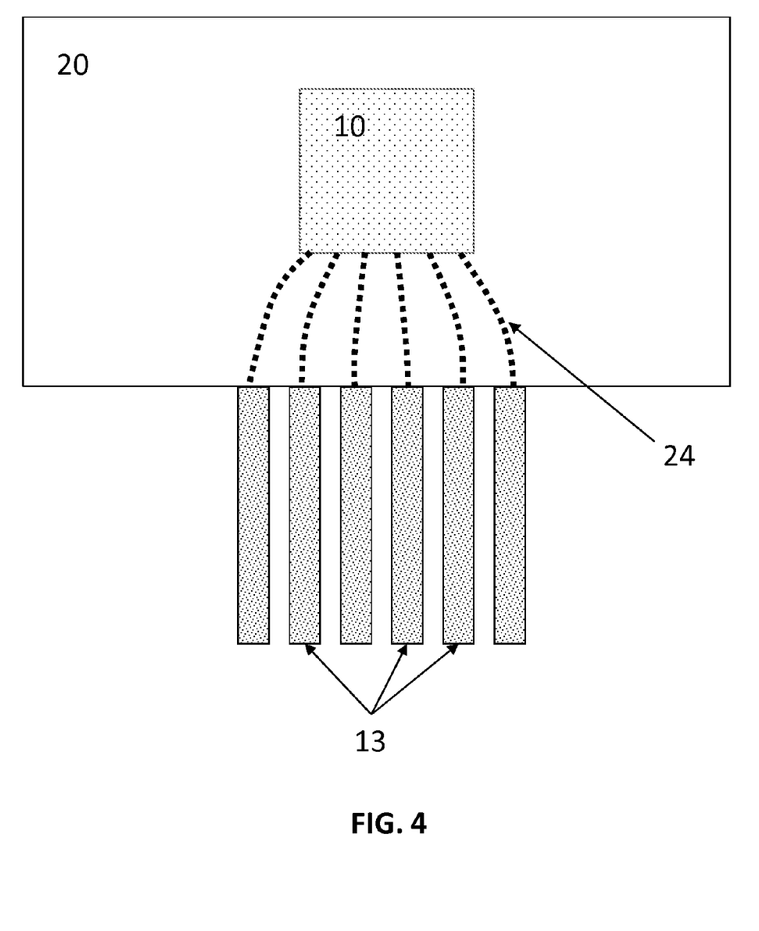
FIG. 4 schematically shows a photonic integrated circuit attached to a glass carrier with optical fibers coupled to integrated optical waveguides by intermediate optical waveguide structures written in the glass carrier according to some embodiments.

FIG. 4 schematically shows an example of a photonic integrated circuit (PIC) 10 attached to a transparent carrier 20, with optical fibers 13 coupled to the transparent carrier 20, in accordance with some embodiment of the present disclosure. The PIC 10 is attached to the transparent carrier 20 with the side comprising integrated waveguides oriented towards the transparent carrier 20, i.e. with its substrate facing away from the transparent carrier 20. In the illustrated embodiment of FIG. 4, a single PIC 10 is attached to the carrier 20. However, the present disclosure is not limited thereto and a plurality of PICs 10 as well as other components may be attached to the same carrier 20. Integrated optical waveguides of the PIC 10 are each optically coupled to an optical fiber 13 by means of an optical interface comprising intermediate waveguide structures 24 that are written by means of a femtosecond laser in the transparent carrier 20 (cover layer). These intermediate waveguide structures 24 can be written from the side of the transparent carrier 20 opposite to the side where the PIC 10 is attached. The optical interface may in addition comprise mode converter components (not shown in FIG. 4) that may also be written in the transparent carrier 20 by means of a femtosecond laser. Mode converter components may also be provided on the silicon photonics integrated circuit to improve mode matching to the intermediate waveguide structures of the optical interface. At the interface between the intermediate waveguide structures 24 and the optical fibers 13, a tapered section may be provided (the intermediate waveguide structure may be tapered) to match the fiber mode. Alternatively, a lensed fiber may be used. Alignment features for the optical fibers 13 may be provided in the transparent carrier 20 (not shown), for example using a FLICE technique.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the invention.

What is claimed is:

1. A method comprising:
   providing a photonic integrated circuit comprising at least one integrated optical waveguide, the photonic integrated circuit having a cover layer;
   providing at least one optical component external to the photonic integrated circuit, the at least one optical component having an optical coupling facet configured to be optically coupled to the at least one integrated optical waveguide, thereby forming an assembly;
   determining a position of the optical coupling facet of the at least one optical component in the assembly;
   determining a position of the at least one integrated optical waveguide;

designing an optical interface pattern between the optical coupling facet of the at least one optical component in the assembly and the at least one integrated optical waveguide; and writing the interface pattern in the cover layer of the photonic integrated circuit by means of a femtosecond laser, thereby forming an optical interface for optically coupling the optical coupling facet and the at least one integrated optical waveguide, wherein the interface pattern comprises at least one intermediate optical waveguide structure.

2. The method according to claim 1, further comprising optically coupling the optical coupling facet to the at least one integrated optical waveguide, thereby forming the assembly.

3. The method according to claim 1, wherein determining the position of the optical coupling facet comprises determining an anticipated position of the optical coupling facet, the anticipated position corresponding to a position of the optical coupling facet after forming the assembly.

4. The method according to claim 1, wherein the interface pattern further comprises at least one mode converter component.

5. The method according to claim 1, wherein the optical component external to the photonic integrated circuit is an optical fiber.

6. The method according to claim 1, wherein the cover layer is selected from the group consisting of a silicon oxide layer, a SiON layer and a polymer layer.

7. The method according to claim 1, wherein the cover layer is a glass carrier layer.

8. The method according to claim 1, wherein determining the position of the optical coupling facet and determining the position of the at least one integrated optical waveguide comprises using an automated process using high-precision machine vision.

9. A method comprising:
providing a photonic integrated circuit comprising at least one integrated optical waveguide, the photonic integrated circuit having a cover layer;
providing at least one optical component external to the photonic integrated circuit, the at least one optical component having an optical coupling facet configured to be optically coupled to the at least one integrated optical waveguide, thereby forming an assembly;
determining a position of the optical coupling facet of the at least one optical component in the assembly;
determining a position of the at least one integrated optical waveguide;

designing an optical interface pattern between the optical coupling facet of the at least one optical component in the assembly and the at least one integrated optical waveguide; and writing the interface pattern in the cover layer of the photonic integrated circuit by means of a femtosecond laser, thereby for optically coupling the optical coupling facet and the at least one integrated optical waveguide, wherein writing the interface pattern comprises irradiating portions of the cover layer with a pulsed femtosecond laser radiation having a sufficiently high energy and focused into a focal volume sufficiently small in size to induce a refractive index change in the focal volume greater than about 3%.

10. The method according to claim 9, wherein the sufficiently high energy of the pulsed femtosecond laser radiation is greater than about 10 µJ.

11. The method according to claim 10, wherein the radiation is focused into a focal volume sufficiently small in size to induce at least one of (i) a smooth isotropic refractive index change within the focal volume, (ii) a birefringent refractive index change within the focal volume, or (iii) formation of one or more voids or cavities within the focal volume.

12. An assembly comprising:
a photonic integrated circuit comprising at least one integrated optical waveguide and having a cover layer; and
at least one optical component external to the photonic integrated circuit, the optical component having an optical coupling facet being optically coupled to the at least one integrated optical waveguide through an optical interface,
wherein the optical interface comprises an interface pattern formed in the cover layer,
wherein the interface pattern comprises at least one intermediate optical waveguide structure, and
wherein the interface pattern further comprises at least one mode converter component.

13. The assembly according to claim 12, wherein the optical component is an optical fiber.

14. The assembly according to claim 12, wherein the cover layer is selected from the group consisting of a silicon oxide layer, a SiON layer and a polymer layer.

15. The assembly according to claim 12, wherein the cover layer is a glass carrier layer.

* * * * *

UNITED STATES PATENT AND TRADEMARK OFFICE
CERTIFICATE OF CORRECTION

PATENT NO. : 9,529,154 B2  
APPLICATION NO. : 14/664673  
DATED : December 27, 2016  
INVENTOR(S) : Geert Van Steenberge et al.

It is certified that error appears in the above-identified patent and that said Letters Patent is hereby corrected as shown below:

In the Specification

In Column 8 at Line 49, Change "$10^{14}$ Wcm$^2$." to --$10^{14}$ W/cm$^2$.--.

In Column 10 at Line 30, Change "my" to --may--.

In the Claims

In Column 14 at Line 7, In Claim 9, after "thereby" insert --forming an optical interface--.

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*